United States Patent [19]
Junkers

[11] Patent Number: 5,934,853
[45] Date of Patent: *Aug. 10, 1999

[54] NUT AND DEVICE FOR TIGHTENING PROVIDED WITH THE SAME

[76] Inventor: John K. Junkers, 7 Arrowhead La., Saddle River, N.J. 07540

[ * ] Notice: This patent issued on a continued prosecution application filed under 37 CFR 1.53(d), and is subject to the twenty year patent term provisions of 35 U.S.C. 154(a)(2).

[21] Appl. No.: 08/957,618

[22] Filed: Oct. 24, 1997

[51] Int. Cl.⁶ .............................. F16B 23/00; F16B 37/08

[52] U.S. Cl. .................... 411/432; 411/402; 411/917; 81/57.22

[58] Field of Search ...................................... 411/383, 384, 411/402, 407, 432, 916, 917; 81/57.14, 57.22

[56] References Cited

U.S. PATENT DOCUMENTS

| 4,622,730 | 11/1986 | Steinbock . | |
|---|---|---|---|
| 4,660,687 | 4/1987 | Williams et al. | 411/432 X |
| 4,685,848 | 8/1987 | Langer | 411/402 |
| 4,810,919 | 3/1989 | Ponce et al. | 411/432 X |
| 5,069,587 | 12/1991 | Levenstein | 411/432 |

*Primary Examiner*—Neill R. Wilson
*Attorney, Agent, or Firm*—Michael J. Striker

[57] ABSTRACT

A nut has a nut member having a thread for engaging a bolt, a stud and the like and a plurality of screw members extending through the nut member and provided at its one ends with gears to be simultaneously engaged by an additional member and simultaneously turned, so as to simultaneously turn the screw members adapted to abut against an object, and to tighten or to loosen the nut. A tightening device includes the inventive nut and an element which simultaneously engages the gears of the screw members and turns them to tighten the nut.

8 Claims, 3 Drawing Sheets

NUT AND DEVICE FOR TIGHTENING PROVIDED WITH THE SAME

BACKGROUND OF THE INVENTION

The present invention generally relates to nuts and in particular to jack-screw nuts, as well as to a tightening device provided with such nuts.

Jack-screw nuts are known in the art. One of such jack screw nuts is disclosed in U.S. Pat. No. 4,622,730. The nut disclosed in this reference has an inner thread connectable with an end of a bolt and a plurality of allen-type screws or hex head screws which are threaded through the wall of the nut and arranged coaxially around the inner thread so as to be equally spaced from one another. The screws extend through threaded holes in the wall of the nut. Their ends are arranged so that when the screws are turned, they abut against a hardened washer sitting on a face of a joint, so as to lift up the nut and to stretch the bolt with a relatively low input force. The idea of this nut is to have each screw of the jack-screw nut carry an equal portion of the created bolt load.

This arrangement has however the following disadvantages. It is necessary to torque down each of the screws onto the washer at a given torque in a given sequence. As the coefficient of friction changes, however the screw which is torqued down creates a side load by tilting the nut. It is therefore very difficult to keep the washer face parallel to the nut face. However this is important for several reasons. If the washer face and the facing nut face are not parallel, one of the screws might carry a larger load than the rest. It either bends or mushrooms out destroying the integrity of the nut. Also, if the washer and the nut face are not parallel to one another, a bending force is applied to the bolt since the nut does not sit completely perpendicular to the bolt axis.

SUMMARY OF THE INVENTION

It is therefore an object of the present invention to provide a nut which avoids the disadvantages of the prior art.

It is also an object of present invention to provide a tightening device with the nut, which avoids the disadvantages of the prior art.

In keeping with these objects and with others which will become apparent hereinafter, one feature of present invention resides, briefly stated in a nut which has a nut member with a thread engageable with an end of a bolt or the like, a plurality of screw members which are screwed in threaded holes of the nut member and each having one end adapted to abut against an object and another end projecting from the nut member, wherein in accordance with the present invention the other end of each screw member is provided with a gear formed so that all gears of all screw members can be engaged by an engaging gear element and turned simultaneously, to simultaneously turn all screw members.

In accordance with another feature of present invention, a tightening device is provided which includes the above mentioned nut designed in accordance with the present invention, and a gear element which simultaneously engages all gears of all screw members and simultaneously turns them.

When the nut and the device are designed in accordance with the present invention, they eliminate the disadvantages of the prior art and provide for highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
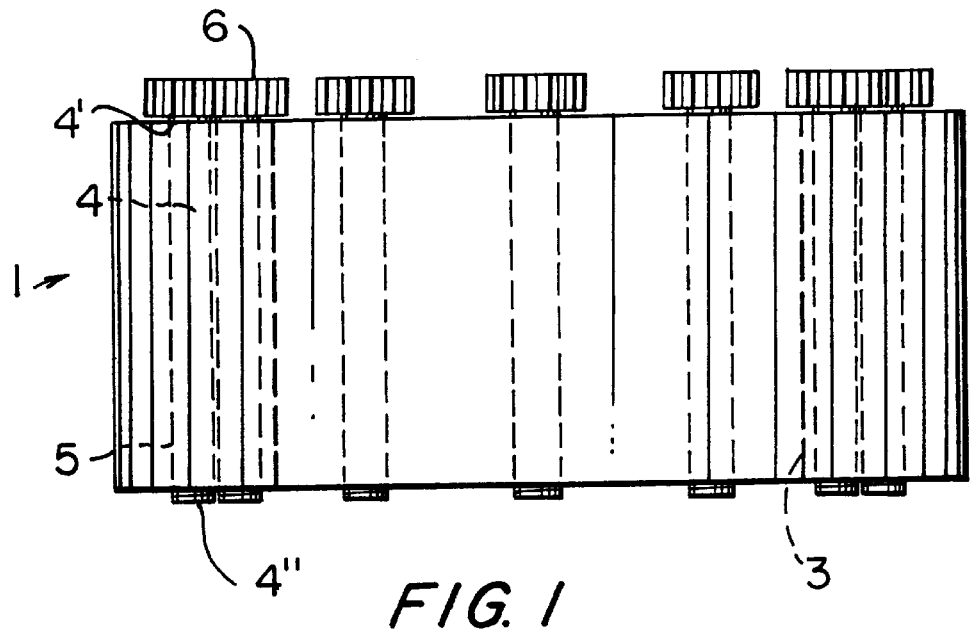
FIGS. 1 and 2 are a side view and a plan view of a nut in accordance with the present invention.
Figure 2:
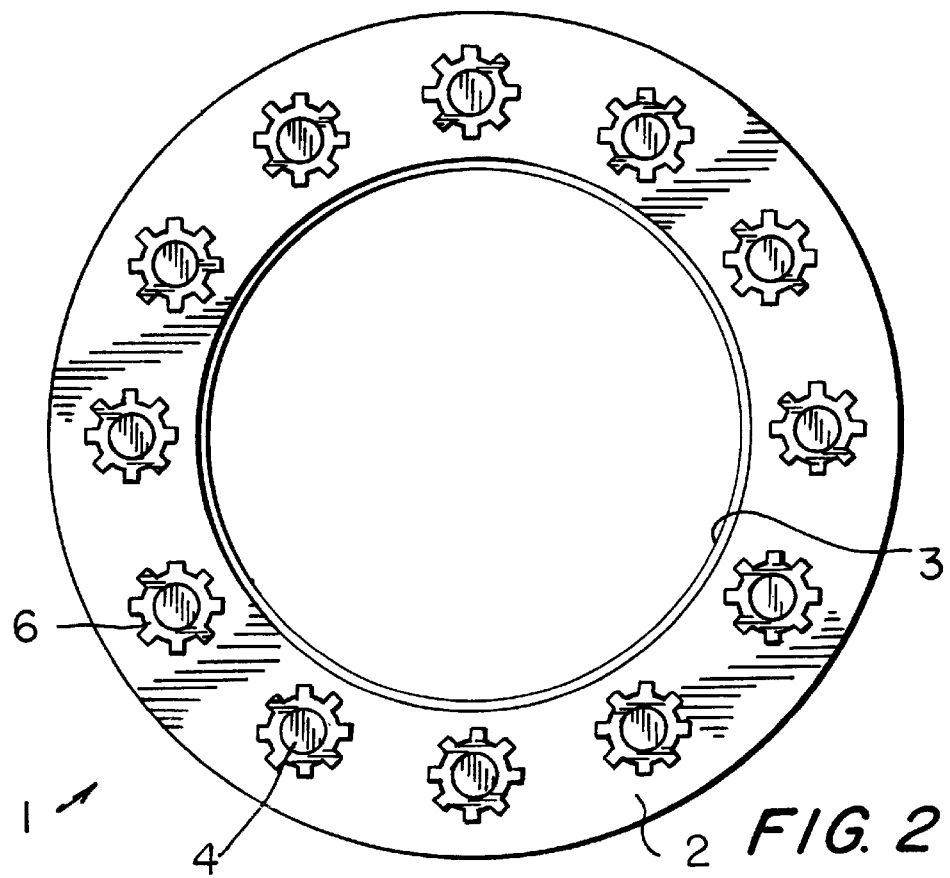

A nut in accordance with the present invention is identified as a whole with reference numeral 1. It has a substantially cylindrical nut member 2 provided with an inner thread 3 for engaging with a bolt, stud and the like. The nut member 2 further has a plurality of screw members 4 which are screwed in a plurality of threaded holes 5. The threaded holes 5 are arranged coaxially around the inner thread 3 of the nut member 2 and spaced from one another by substantially equal peripheral distances.

Each screw member 4 has a first end adapted to abut against an object, as will be explained hereinbelow, and a second opposite end 4'. A gear 6 is non rotatably mounted on the end 4' of each screw member 4 for joint rotation for the screw members. The gears 6 are formed so that they can be engaged by a tool and turned simultaneously.

Figure 3:
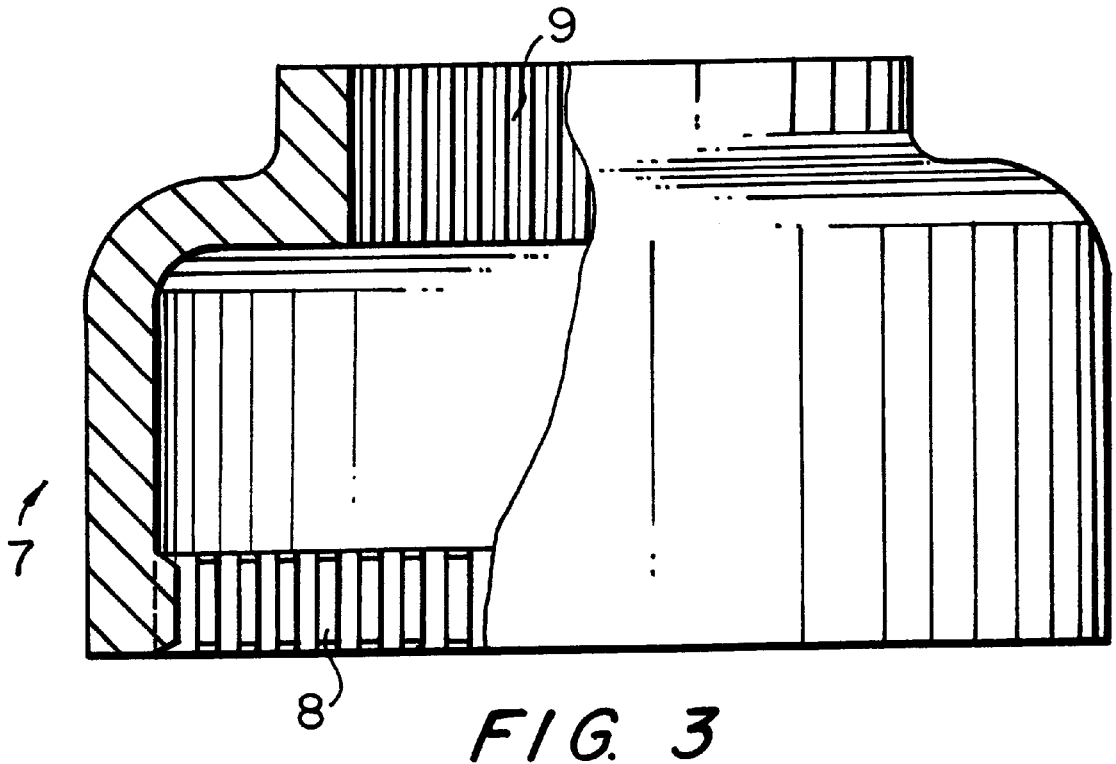
FIG. 3 is a view showing an intermediate element connectable to a tool and used for tightening or loosening the nut in accordance with the present invention.

FIG. 3 shows an element which is engageable simultaneously with all gears 6 of the screw members 4 and is connectable with a tool. The element is formed as a hollow socket 7. The socket 7 has a first end provided with a plurality of teeth 8 corresponding to the teeth of the gears 6. It also has a second end provided with a formation for connecting to a tool, such as for example a plurality of axially extending splines 9. A tool having a drive shaft provided with a plurality of corresponding splines can engage with the splines 9 of the socket 7, while the teeth 8 of the socket 7 outwardly engage the gears 6 of the screws 4 of the nut 1.

Figure 4:
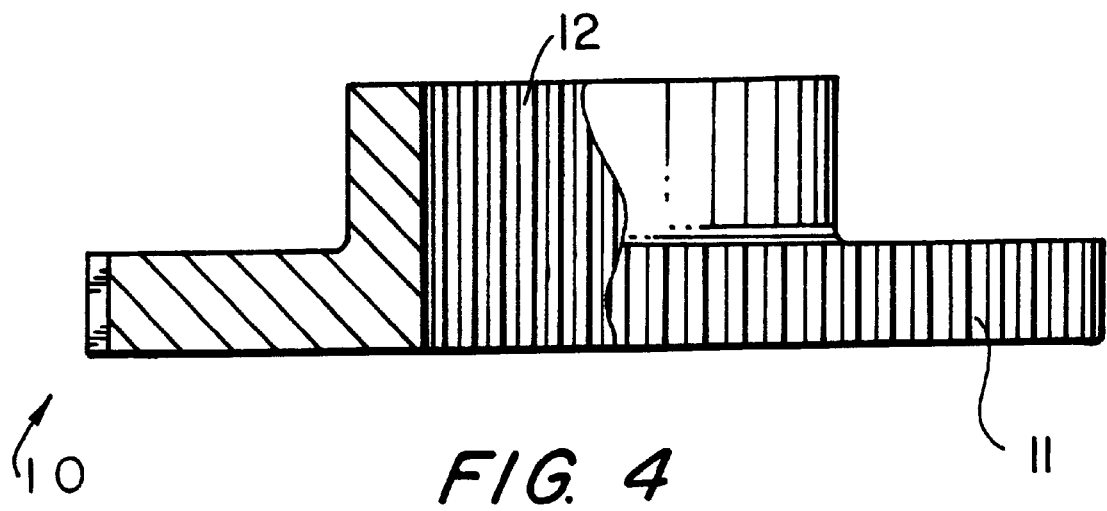
FIG. 4 is a view showing another embodiment of the connecting element connectable to the tool and used for tightening or loosening the inventive nut.

Another element member is shown FIG. 4. The element 10 is formed as a disk provided with a plurality of outer teeth 11 corresponding to the teeth of the gears 6 of the screw members 4 of the nut 1. It also has a central hollow formation formed for example by a plurality of splines 12. A drive shaft of a tool provided with a plurality of splines engages with the splines 12 of the intermediate element 10, while the teeth 11 of the intermediate element 10 engage inwardly with the gears 6 of the screw members 4 of the nut 1.

Figure 5:
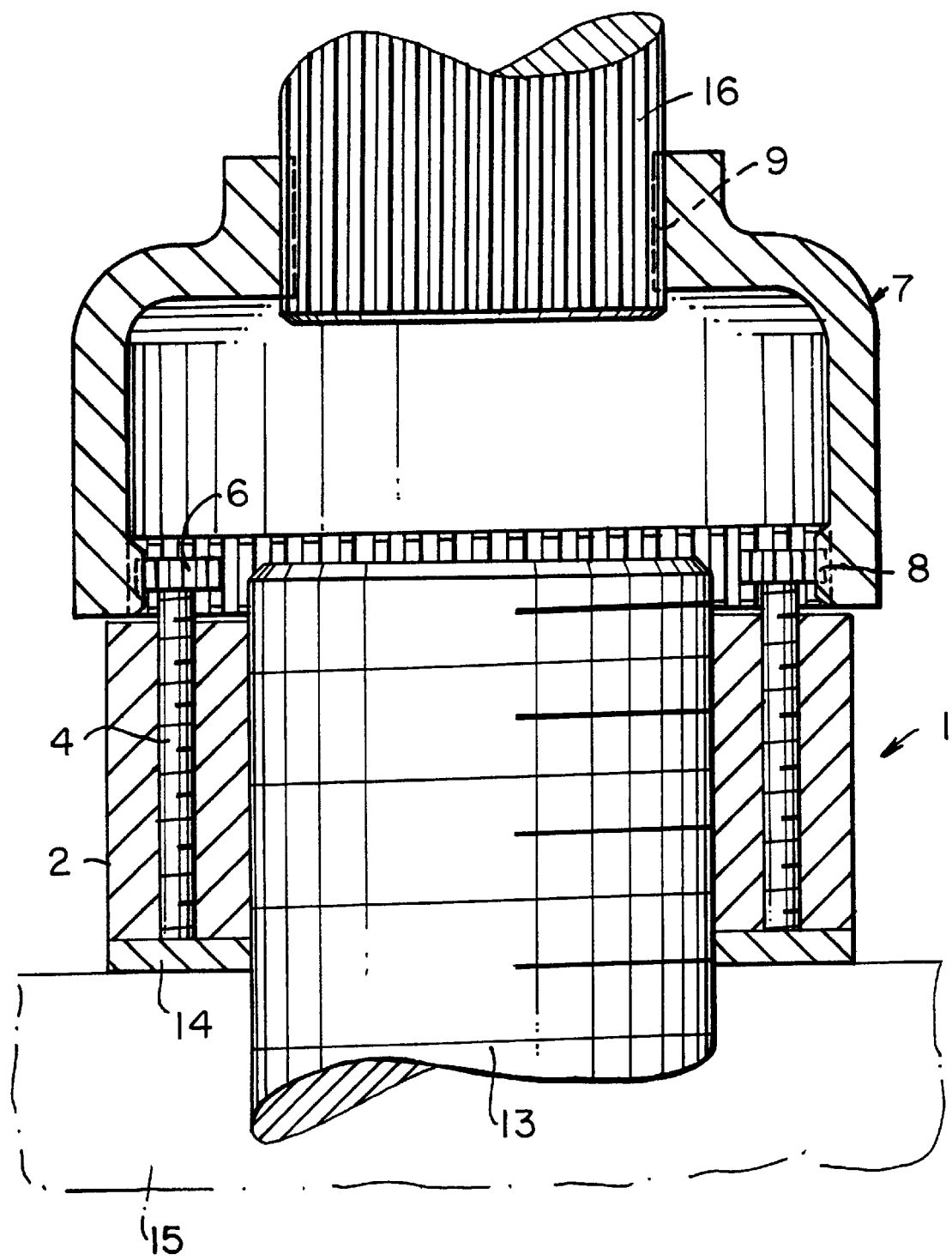
FIG. 5 is a view showing a process of tightening or loosening the inventive nut in accordance with the present invention.

The nut in accordance with the present invention operates in the following manner:

When it is necessary to tighten the nut on a bolt 13, the screw members 4 which have its equal lengths are arranged so that their lower ends 4" are flush with the lower end face of the nut member 2 as shown in FIG. 5. The nut 1 is then turned down on the bolt 13 until the lower end face of the nut member 2 meets an upper face of a washer 14 arranged on an upper surface of an object 15, for example a flange or the like. Then the socket 7 is fitted over the nut 1 and the inner teeth 8 of the socket 7 engage outwardly the gears 6 of the screw members 4 of the nut. A driving shaft 16 of the tool is inserted into the opposite end of the socket 7 and its splines engage with the splines 9 of the socket. When the driving shaft 16 of the power tool is turned, the screw members 4 are turned at an equal speed and to equal degrees, until a combined precalculated torque is reached. The lower face of the nut 1 and the upper face of the washer 14 are parallel to one another, all screw members 4 have obtained the same torque since the tilting action and the unknown coefficient of friction of the screws, which existed in the prior art nuts, are eliminated. All screw members 4 are turned simultaneously to tighten the nut 1 on the bolt 13.

When for this purpose the element 10 of FIG. 4 is used, its teeth 11 engages the gears 6 of the unit 1 from inside.

The loosening of the nut 1 from the bolt 13 is performed in a reverse order.

It will be understood that each of the elements described above, or two or more together, may also find a useful application in other types of constructions differing from the types described above.

While the invention has been illustrated and described as embodied in nut and device for tightening provided with the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A nut for a bolt and the like, comprising a nut member provided with a thread engageable with a thread of a bolt; a plurality of screw members screwable in said nut member and having a first end adapted to abut against an object and a second opposite end; said opposite end of each of said screw members being provided with a gear formed so that all said gears of all said screw members can be engaged simultaneously by an additional element and turned simultaneously so as to simultaneously turn all said screw members.

2. A nut as defined in claim 1, wherein said nut member has an axis, said screw members extending in an axial direction and being arranged around said axis of said nut member at substantially equal peripheral distances.

3. A device for tightening and loosening, comprising a nut including a nut member provided with a thread engageable with a thread of a bolt, a plurality of screw members screwable in said nut member and having a first end adapted to abut against an object and a second opposite end, said opposite end of each of said screw members being provided with a gear; and an element simultaneously engaging all said gears of all said screw members so as to simultaneously turn all said gears and thereby all said screw members.

4. A device as defined in claim 3, wherein said nut member has an axis, said screw members extending in an axial direction and being arranged around said axis of said nut member at substantially equal peripheral distances.

5. A device as defined in claim 3, wherein said element has a plurality of inner gears engageable with said gears of said screw members.

6. A device as defined in claim 5, wherein said intermediate element is formed as a socket having one end provided with said inner gears engageable with said gears of said screw members and another end provided with an additional formation engageable by a tool.

7. A device as defined in claim 3, wherein said element is provided with a plurality of outer gears inwardly engaging said gears of said screw members.

8. A device as defined in claim 7, wherein said element is formed as a disk having an outer surface provided with said outer gears engageable with said gears of said screw members and an additional formation engageable by a tool.

* * * * *